US008037578B2

(12) United States Patent
Megason

(10) Patent No.: US 8,037,578 B2
(45) Date of Patent: Oct. 18, 2011

(54) LOW-PROFILE ASSEMBLIES

(75) Inventor: George D Megason, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 12/123,657

(22) Filed: May 20, 2008

(65) Prior Publication Data
US 2008/0295289 A1    Dec. 4, 2008

Related U.S. Application Data

(60) Provisional application No. 60/941,877, filed on Jun. 4, 2007.

(51) Int. Cl.
*A45C 7/00* (2006.01)
(52) U.S. Cl. .................. 16/438; 16/2.1; 16/273
(58) Field of Classification Search ............ 16/422, 16/110.1, 425, 426, 429, 438, 268, 273, 380, 16/108, 109, 2.1; 312/223.1; 74/547; 24/713.7; 29/509, 525.01; 411/177–178, 432
See application file for complete search history.

(56) References Cited

U.S. PATENT DOCUMENTS

| 66,296 | A | * | 7/1867 | Brown | 16/2.1 |
| 395,478 | A | * | 1/1889 | Brass | 24/713.7 |
| 2,583,719 | A | * | 1/1952 | White | 16/2.1 |
| 3,399,435 | A | * | 9/1968 | Ackerman, Jr. | 16/2.1 |
| 5,526,209 | A | * | 6/1996 | Ota | 360/132 |
| 7,125,272 | B1 | * | 10/2006 | Liang | 439/160 |
| 7,168,772 | B1 | * | 1/2007 | Liang | 292/336.3 |

FOREIGN PATENT DOCUMENTS

DE     4243149  A1  *  6/1994

* cited by examiner

*Primary Examiner* — Victor Batson
*Assistant Examiner* — Jeffrey O'Brien

(57) ABSTRACT

In one embodiment, a pivot assembly includes a component including a top surface and a post that extends upward from the top surface, a pivot member that can be pivoted about a pivot axis defined by the post, the pivot member having a top surface, and a retaining collar that secures the pivot member to the component, the retaining collar being positioned between the post and the pivot member.

3 Claims, 3 Drawing Sheets

LOW-PROFILE ASSEMBLIES

CROSS-REFERENCE TO RELATED APPLICATION

This application claims priority to copending U.S. provisional application entitled, "Collar for Attaching a Rotating Device to Sheetmetal When Thickness Constrains are Extreme," Ser. No. 60/941,877, filed Jun. 4, 2007, which is entirely incorporated herein by reference.

BACKGROUND

It is occasionally necessary to attach a pivot member, such as a pull handle, to a piece of sheet metal. There are various methods for achieving such attachment. In one such method, a handle can be secured to a piece of sheet metal using separate attachment hardware, such as a threaded fastener that threads into a nut that has been press fit into or otherwise attached to the sheet metal.

Although the use of such attachment hardware is acceptable in some applications, it may not be in others. For example, in a limited clearance application, in which the handle must be very thin due to lack of space, there simply may not be space for a nut. In such circumstances, the handle can instead be attached to the sheet metal using a swaging process. In such a process, a post is extruded from the sheet metal so as to extend from a top surface of the sheet metal. The handle can then be placed over the post and the post can be swaged down on top of the handle to secure the handle to the sheet metal.

While such a solution results in a low profile assembly, it also typically results in a handle that is either too tight or too loose due to difficulty in controlling the swaging process. In addition, the handle may bind in certain angular positions during use, resulting in a handle that cannot be smoothly operated. Although the handle may be functional in such situations, it may create the perception of poor quality for the user.

BRIEF DESCRIPTION OF THE DRAWINGS

The disclosed pivot assemblies can be better understood with reference to the following drawings. The components in the drawings are not necessarily to scale.

DETAILED DESCRIPTION

As described above, it is occasionally necessary to attach a pivot member, such as a pull handle, to another component, such as a piece of sheet metal. Although such attachment can be achieved using a threaded fastener and a nut, such hardware may be too large for low clearance applications. In such circumstances, the pivot member alternatively can be attached to the other component using a swaging process in which a post of the other component is swaged down on top of the handle. Unfortunately, such a solution may result in a handle that is either too tight or too lose, or that cannot be operated smoothly.

As described in the following, such disadvantages can be reduced or avoided by attaching or mounting a pivot member to a component using a retaining collar that is adapted to be attached to the component to retain the pivot member. In some embodiments, a post is provided on or formed from the component that receives both the handle and the collar. Once the handle and collar have been positioned about the post, the post can be swaged down onto the collar to fixedly secure it to the component and retain the handle. Because the collar rests on top of the component and is no taller than the handle, no hardware extends below the bottom surface of the component or beyond the top surface of the handle. Moreover, because the post is swaged to the collar instead of the handle, the pivot characteristics of the handle can be better controlled to avoid a result in which the handle is too tight, too loose, or binds when pivoted.

Figure 1:
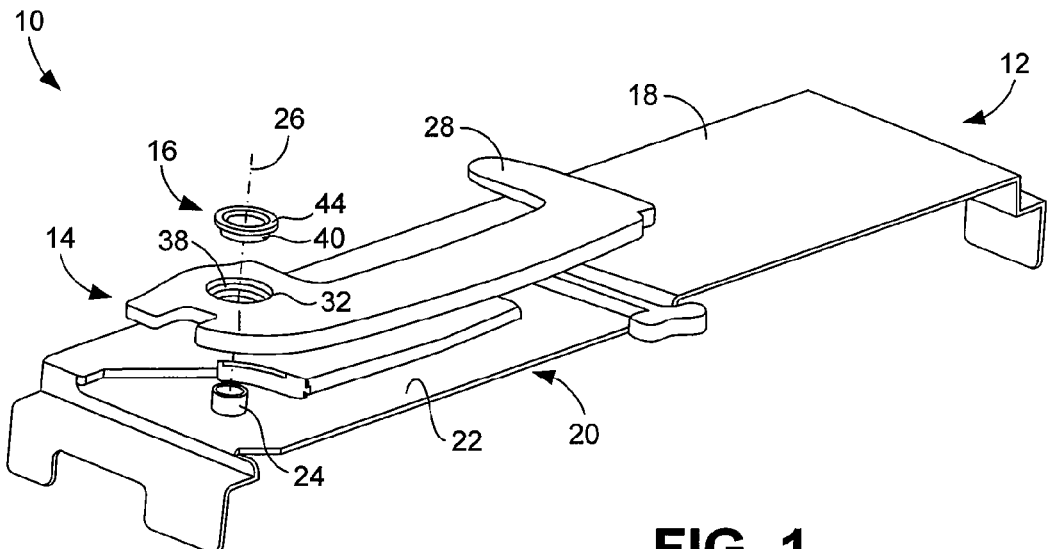
FIG. 1 is perspective view of components of an embodiment of a pivot assembly.
Figure 2:
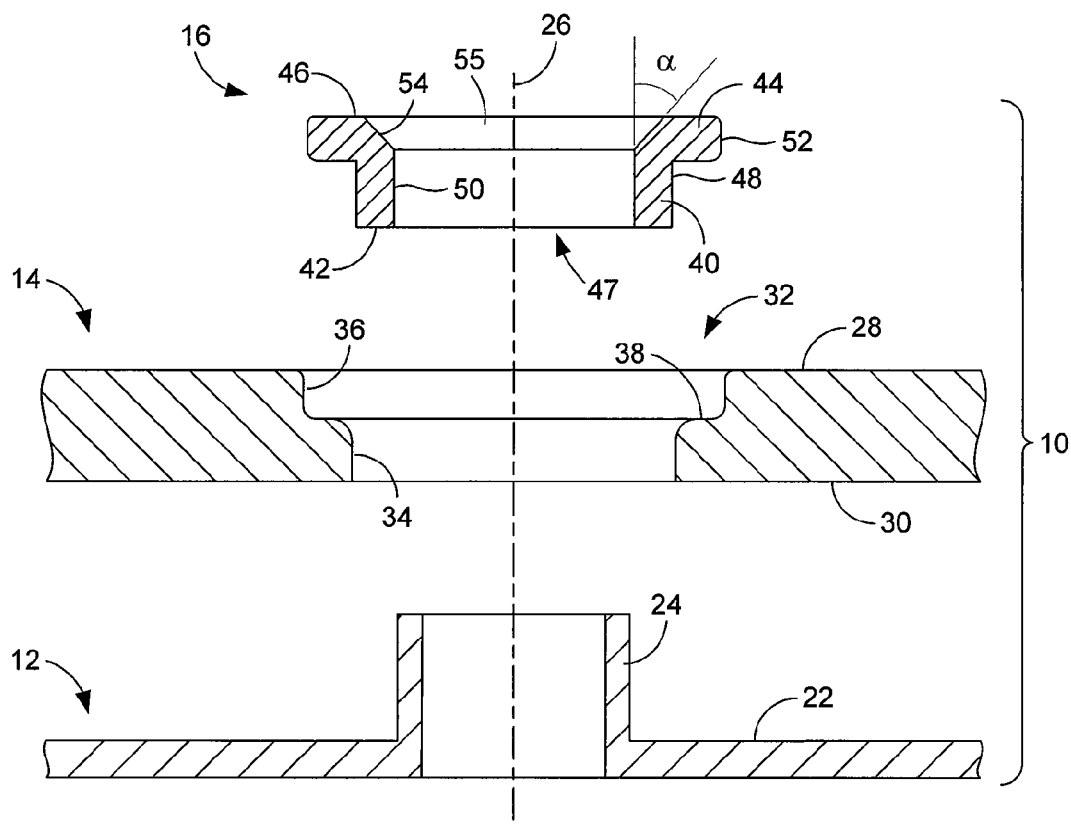
FIG. 2 is a partial cross-sectional view of the components of FIG. 1.

Referring now in more detail to the drawings in which like numerals indicate corresponding parts throughout the views, FIGS. 1 and 2 illustrate components of an example pivot assembly 10. As shown those figures, the components generally include a sheet metal component 12, a pivot member 14, and a retaining collar 16. By way of example, the sheet metal component 12 comprises part of a housing of a module (not shown) that is adapted to fit within a separate computer component (not shown). In such a case, there may be limited clearance for the module and no portion of the module may extend beyond the plane of the outer surface 18 of the sheet metal component 12.

As shown in FIG. 1, the sheet metal component 12 comprises a depression or recess 20 that is sized and configured to receive the pivot member 14. Extending from a top surface 22 of the recess 20 is a hollow cylindrical post 24, which can be formed through extrusion. As described below, both the pivot member 14 and the retaining collar 16 can be provided on the post 24 during the assembly process. Once assembly is completed, the pivot member 14 will be free to pivot or rotate about the collar 16. Accordingly, the central axis of the post 24 defines a pivot or rotation axis 26 for the pivot member 14.

In the example embodiment, the pivot member 14 comprises a pull handle that is used as a lever that assists a user in the insertion and/or removal of the module in which the sheet metal component 12 is used. For convenience in describing the assembly 10 and its function, the pivot member 14 will be referred to as the "handle" 14 from this point forward. As indicated most clearly in FIG. 2, the handle 14 includes a top surface 28 and a bottom surface 30. The distance between the top and bottom surfaces 28, 30 comprises the height of the handle 14 that, as described below, is no greater than the depth of the recess 20 of the sheet metal component 12.

Extending between the top and bottom surfaces 28, 30 of the handle 14 is a mounting opening 32 that is adapted to receive both the post 24 and the retaining collar 16 when the handle is placed within the recess 20 of the sheet metal component 12. As indicated in FIG. 2, the opening 26 comprises a first or bottom section 34 having a first diameter and a second or top section 36 having a second diameter that is larger than the first diameter. Such an arrangement results in a stepped configuration that forms a ledge or step 38. As described below, the step 38 facilitates retention of the handle 14. Notably, each of the first and second diameters, and therefore the opening 32 in general, is significantly larger than the diameter of the post 24 of the sheet metal component 12. As will become apparent below, that larger size creates space for the retaining collar 16.

With further reference to FIGS. 1 and 2, the retaining collar 16 comprises a body portion 40 that forms a first or bottom surface 42 of the collar and a shoulder portion 44 that forms a second or top surface 46 of the collar. The body portion 40 and the shoulder portion 44 together form a mounting opening 47. The body portion 40 is generally cylindrical and includes an outer surface 48 having a first or outer diameter and an inner surface 50 having a second or inner diameter that is smaller than the outer diameter. Generally speaking, the outer diameter is slightly smaller than the diameter of the bottom section 34 of the opening 32 of the handle 14 and the inner diameter is slightly larger than the outer diameter of the post 24 of the sheet metal component 12.

The shoulder portion 44 extends laterally outward from the outer surface 48 of the body portion 40 and is also generally cylindrical. The shoulder portion 44 therefore defines a further outer surface 52 having a third or outer diameter, which is slightly smaller than the diameter of the top section 36 of the handle 14. The shoulder portion 44 further comprises an angled inner surface 54 that extends from the inner surface 50 of the body portion 40 at an outward angle to the top surface 46 of the collar 16 to therefore form a chamfer 55. By way of example, the inner surface 54 forms an angle, α, of approximately 30 to 60 degrees relative to the pivot axis 26. As described below, the inner surface 54 serves as a contact surface for the post 24 after it has been swaged down onto the collar 16.

Figure 3:
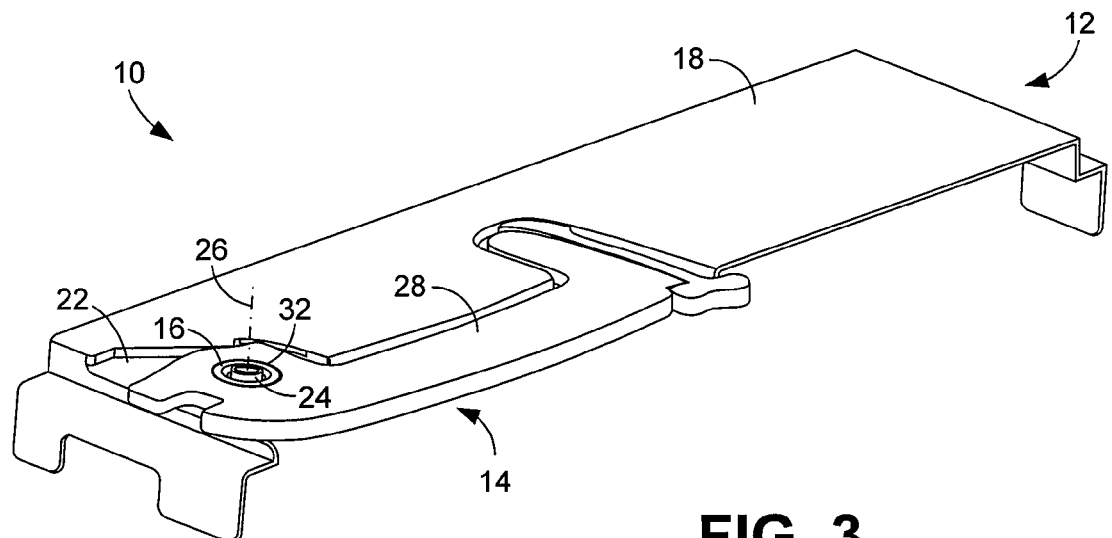
FIG. 3 is a perspective view of the pivot assembly of FIG. 1 after the assembly has been partially assembled.
Figure 4:
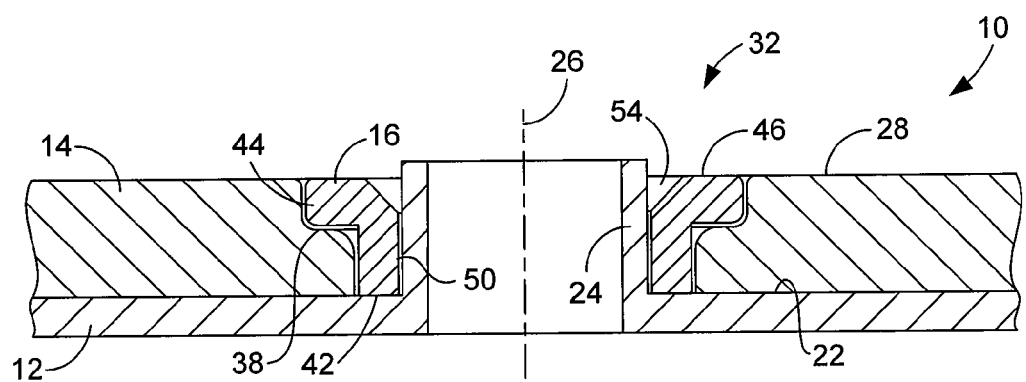
FIG. 4 is a partial cross-sectional view of the pivot assembly in the partially assembled state of FIG. 3.

Referring next to FIGS. 3 and 4, the handle 14 has been placed within the recess 20 formed in the sheet metal component 12 such that the post 24 extends through the opening 32 formed in the handle and the handle rests upon the top surface 22 of the recess. As shown most clearly in FIG. 3, the handle 14 does not extend beyond the outer surface 18 of the sheet metal component 12 when the handle is disposed in the recess 20 because the height (or thickness) of the handle does not exceed the depth of the recess. By way of example, the height of the handle 14 is approximately the same as the dept of the recess 20 such that the top surface 28 is approximately flush with the outer surface 18 of the sheet metal component 12 (FIG. 3).

With further reference to FIGS. 3 and 4, the retaining collar 16 has also been placed over the post 24 such that the collar also rests upon the top surface 22 of the recess 20. As shown most clearly in FIG. 4, when the collar 16 is so placed, the collar is received within the opening 32 of the handle 14 such that the collar is positioned between the post 24 and the handle with only limited clearance. In addition, the shoulder portion 44 of the collar 16 is positioned opposite the step 38, for example in close proximity to the step. As described below, the relative positions of the shoulder portion 44 and the step 38 retains the handle 14 in place on the sheet metal component 12 when the collar has been secured to the component. As is apparent in FIGS. 3 and 4, the collar 16 does not protrude above the top surface 28 of the handle or the outer surface 18 of the sheet metal component 12. By way of example, the collar 16 is approximately as tall as the handle 14, such that the top surface 46 of the collar is approximately flush with the top surface 28 of the handle (FIG. 4). Unlike the collar 16, however, the post 24 extends beyond the top surface 46 of the collar 16, as most clearly shown in FIG. 4.

Figure 5:
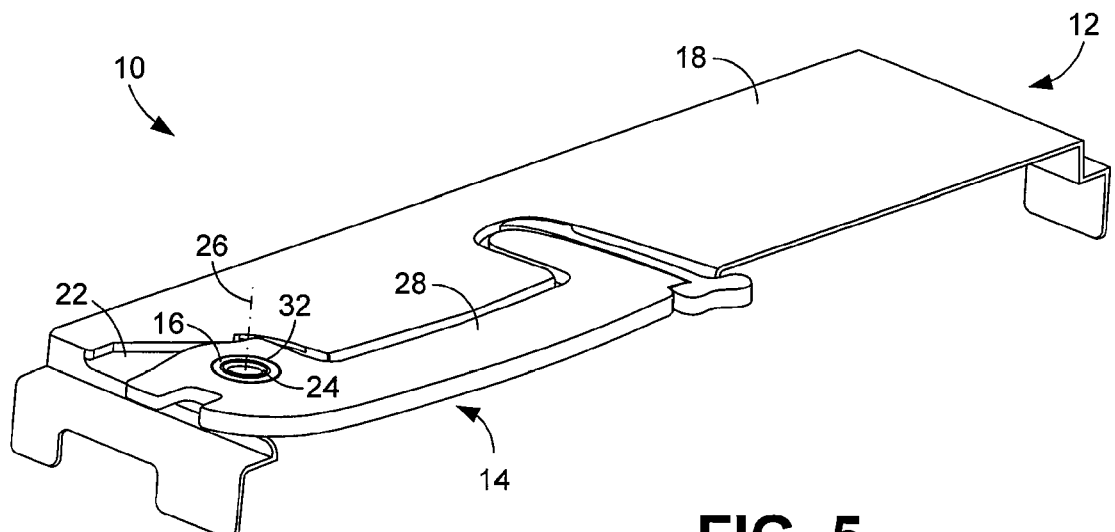
FIG. 5 is a perspective view of the pivot assembly of FIG. 1 after the assembly has been fully assembled.
Figure 6:
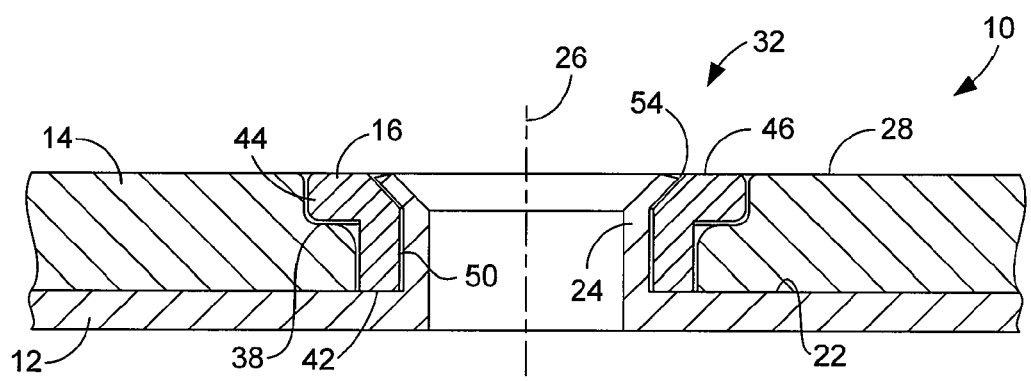
FIG. 6 is a partial cross-sectional view of the pivot assembly in the fully assembled state of FIG. 5.

Turning to FIGS. 5 and 6, the assembly 10 is shown in the fully assembled state. As indicated in those figures, the post 24 has been, pressed, for example swaged, onto the collar 16 and, more particularly, onto the inner surface 54 of the collar to fixedly secure the collar to the sheet metal component 12. Due to that securing, and further due to the fact that the shoulder portion 44 of the collar 16 prevents the handle 14 from separating from the component 12, the handle is also secured to the component. However, because the post 24 has not been swaged onto and does not contact the handle 14, the handle can be freely pivoted about the pivot axis 26. By controlling the relative dimensions of the collar 16 and the handle 14, the friction that opposes such pivoting can be controlled irrespective of the force used to secure the collar to the sheet metal component 12. Accordingly, a handle 14 that smoothly pivots with a desired degree of tightness or looseness can be achieved, thereby ensuring a favorable impression of the user.

The invention claimed is:

1. A low-profile pivot assembly comprising:
    a sheet metal component including a top surface, a bottom surface, and an extruded post that extends upward from the top surface;
    a pull handle that can be pivoted about a pivot axis defined by the post, the pull handle, including:
        a bottom surface that rests on the top surface of the sheet metal component;
        a top surface above the pull handle bottom surface; and
        a mounting opening through which the post extends, the mounting opening comprising a bottom section having a first diameter and a top section having a second diameter, the second diameter being larger than the first diameter such that the mounting opening forms a step; and
    a retaining collar that secures the handle to the sheet metal component, the retaining collar being positioned within the mounting opening of the pull handle between the pull handle and the post, the retaining collar comprising a mounting opening through which the post extends, the retaining collar further comprising a shoulder positioned in close proximity to the step of the pull handle mounting opening, the retaining collar being fixedly secured to the sheet metal component, the retaining collar placed over the post downward toward the bottom surface of the pull handle and toward the top surface of the sheet metal component such that a bottom surface of the retaining collar contacts the top surface of the sheet metal component;
    wherein the retaining collar does not extend above the top surface of the handle.

2. The assembly of claim 1, wherein the post is swaged onto the retaining collar to fixedly secure the retaining collar to the top surface of the sheet metal component.

3. The assembly of claim 2, wherein retaining collar mounting opening comprises a chamfer into which the post is swaged such that the post does not extend beyond the top surface of pivot member.

* * * * *

UNITED STATES PATENT AND TRADEMARK OFFICE
CERTIFICATE OF CORRECTION

| | | |
|---|---|---|
| PATENT NO. | : 8,037,578 B2 | |
| APPLICATION NO. | : 12/123657 | |
| DATED | : October 18, 2011 | |
| INVENTOR(S) | : George D Megason | |

It is certified that error appears in the above-identified patent and that said Letters Patent is hereby corrected as shown below:

In column 4, line 27, in Claim 1, delete "handle," and insert -- handle --, therefor.

Signed and Sealed this
Nineteenth Day of June, 2012

David J. Kappos
*Director of the United States Patent and Trademark Office*